United States Patent
Doumae et al.

(10) Patent No.: US 12,445,994 B2
(45) Date of Patent: Oct. 14, 2025

(54) ESTIMATION SYSTEM AND ESTIMATION METHOD

(71) Applicant: DAIKIN INDUSTRIES, LTD., Osaka (JP)

(72) Inventors: Hiroshi Doumae, Osaka (JP); Shin Higashiyama, Osaka (JP); Takuya Hanada, Osaka (JP); Hiroki Ueda, Osaka (JP); Hiroshi Nakayama, Osaka (JP); Naotoshi Fujita, Osaka (JP); Yuusuke Asada, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 297 days.

(21) Appl. No.: 18/017,808

(22) PCT Filed: Jul. 21, 2021

(86) PCT No.: PCT/JP2021/027324
§ 371 (c)(1),
(2) Date: Jan. 24, 2023

(87) PCT Pub. No.: WO2022/024924
PCT Pub. Date: Feb. 3, 2022

(65) Prior Publication Data
US 2023/0284172 A1    Sep. 7, 2023

(30) Foreign Application Priority Data

Jul. 27, 2020    (JP) .................. 2020-126717

(51) Int. Cl.
H04L 1/00    (2006.01)
G01S 13/74    (2006.01)
H04W 64/00    (2009.01)

(52) U.S. Cl.
CPC ............. *H04W 64/00* (2013.01); *G01S 13/74* (2013.01)

(58) Field of Classification Search
CPC ...... G01S 13/74; H04L 1/0068; H04W 76/30; H04W 24/08; H04W 64/00; H04W 24/10; H04B 17/27; H04B 17/20
See application file for complete search history.

(56) References Cited

U.S. PATENT DOCUMENTS

2005/0032527 A1    2/2005    Sheha et al.
2015/0326704 A1    11/2015    Ko et al.
(Continued)

FOREIGN PATENT DOCUMENTS

CN    111413970 A    7/2020
JP    2017-32469 A    2/2017

OTHER PUBLICATIONS

International Search Report for PCT/JP2021/027324 mailed on Oct. 19, 2021.
(Continued)

*Primary Examiner* — Phuoc H Doan
(74) *Attorney, Agent, or Firm* — Birch, Stewart, Kolasch & Birch, LLP

(57) ABSTRACT

An estimation system estimates the arrangement of objects. The estimation system includes an estimation unit. The estimation unit obtains information related to an arrangement pattern of the objects as first information and obtains, from wireless devices respectively connected to the objects, information including response times between the wireless devices as second information to estimate the arrangement of the objects based on the first information and the second information.

19 Claims, 8 Drawing Sheets

(56) References Cited

U.S. PATENT DOCUMENTS

| | | |
|---|---|---|
| 2015/0341599 A1 | 11/2015 | Carey |
| 2016/0150196 A1 | 5/2016 | Horvath |
| 2017/0041740 A1* | 2/2017 | Kanayama ........... H04B 17/318 |
| 2018/0038694 A1 | 2/2018 | Bruemmer et al. |

OTHER PUBLICATIONS

International Preliminary Report on Patentability and English translation of the Written Opinion of the International Searching Authority, for International Application No. PCT/JP2021/027324, dated Feb. 9, 2023.

Extended European Search Report for European Application No. 21848972.2, dated Jan. 15, 2024.

* cited by examiner

Fig.5

| R1 | y1 | y2 | y3 |
| --- | --- | --- | --- |
| R2 | y1 | y3 | y2 |
| R3 | y2 | y1 | y3 |
| R4 | y2 | y3 | y1 |
| R5 | y3 | y1 | y2 |
| R6 | y3 | y2 | y1 |

|   | A | B | C |
|---|---|---|---|
| A |   | — | — |
| B | ① x1 |   | — |
| C | ② x2 | ③ x3 |   |

|   | a | b | c |
|---|---|---|---|
| a |   | — | — |
| b | ① y1 |   | — |
| c | ② y2 | ③ y3 |   |

|   | A | B | C |
|---|---|---|---|
| A |   | — | — |
| B | ① x1 |   | — |
| C | ② x2 | ③ x3 |   |

|   | a | c | b |
|---|---|---|---|
| a |   | — | — |
| c | ① y2 |   | — |
| b | ② y1 | ③ y3 |   |

$$SM = (y2-x1)^2 + (y1-x2)^2 + (y3-x3)^2$$

Correspondence between two objects and two wireless devices

| AB | BC | CA |
|----|----|----|
| ac | cb | ba |

Combination of objects and wireless devices

| A | B | C |
|---|---|---|
| a | c | b |

Fig.9

| | | | |
|---|---|---|---|
| R1 | x1 | x2 | x3 |
| R2 | x1 | x3 | x2 |
| R3 | x2 | x1 | x3 |
| R4 | x2 | x3 | x1 |
| R5 | x3 | x1 | x2 |
| R6 | x3 | x2 | x1 |

Fig.10

| | a | b | c |
|---|---|---|---|
| a | \ | — | — |
| b | y1 ① | \ | — |
| c | y2 ② | y3 ③ | \ |

| | A | C | B |
|---|---|---|---|
| A | \ | — | — |
| C | x2 ① | \ | — |
| B | x1 ② | x3 ③ | \ |

$$SM = (x2-y1)^2 + (x1-y2)^2 + (x3-y3)^2$$

Correspondence between two objects and two wireless devices

| ab | bc | ca |
|---|---|---|
| AC | BC | AB |

Combination of objects and wireless devices

| a | b | c |
|---|---|---|
| A | C | B |

| | Combination of objects and wireless devices | | | | |
|---|---|---|---|---|---|
| | A | B | C (Z) | D | Determination |
| Estimation 1 | a | d | b (z) | c | ○ |
| Estimation 2 | a | b (z) | d | c | × |

|  | Combination of objects and wireless devices (B=d) | | | | |
|---|---|---|---|---|---|
|  | A | B | C | D | Determination |
| Estimation 1 | a | d | b | c | ○ |
| Estimation 2 | a | b | d | c | × |

ESTIMATION SYSTEM AND ESTIMATION METHOD

TECHNICAL FIELD

The present disclosure relates to an estimation system and an estimation method.

BACKGROUND

Patent Literature 1 discloses a known technique related to a system for estimating the arrangement of devices. In the technique disclosed in Patent Literature 1, when installation positions of wireless devices are not specified, arrangement positions of the wireless devices are estimated.

CITATION LIST

Patent Literature

Patent Literature 1: Japanese Laid-Open Patent Publication No. 2017-32469

SUMMARY OF INVENTION

Technical Problem

In the prior art, the arrangement of the wireless devices is obtained by estimating the distances between the wireless devices based on radio field intensities of the wireless devices. However, the radio field intensities may be weakened when there are obstacles between the wireless devices. Thus, the arrangement of the wireless devices may be unable to be accurately estimated. It is an object of the present disclosure to provide an estimation system and an estimation method capable of accurately estimating the arrangement of objects.

Solution to Problem

An estimation system that solves the problem estimates an arrangement of objects. The estimation system includes an estimation unit that obtains information related to an arrangement pattern of the objects as first information and obtains, from wireless devices respectively connected to the objects, information including response times between the wireless devices as second information to estimate the arrangement of the objects based on the first information and the second information. In this configuration, the combination of the objects and the wireless devices in the arrangement pattern is estimated based on the information including the response times between the wireless devices and information related to the arrangement pattern of the objects. This allows the arrangement of the objects to be accurately estimated in association with the wireless devices.

In the estimation system, the estimation unit estimates a combination of the objects and the wireless devices in the arrangement pattern based on the first information and the second information in an arrangement space in which the wireless devices are respectively connected to the objects in a one-to-one relationship; obtains specific information of the objects respectively connected to the wireless devices from the wireless devices, and associates the specific information of the objects with the objects in the arrangement pattern based on the combination of the objects and the wireless devices and the specific information of the objects in the arrangement pattern. This configuration allows the arrangement of the objects to be estimated in association with the specific information of the objects.

The estimation system includes a particular wireless device capable of communicating with the wireless devices and arranged in the arrangement space. The estimation unit defines the particular wireless device as belonging to any of the objects and the wireless devices, obtains, as the first information, information related to an arrangement pattern of the objects and the particular wireless device arranged in the arrangement space, obtains, as the second information, information including response times between the wireless devices obtained from a wireless device group that includes the wireless devices and the particular wireless device, and estimates the combination of the objects and the wireless devices in the arrangement pattern based on the first information and the second information.

The particular wireless device belongs to the objects and the wireless devices. Thus, in the estimation of a combination of the objects and the wireless devices, the particular wireless device is treated as a device in which the combination of the objects and the wireless devices is predetermined. Such a particular wireless device is arranged at a predetermined position in the arrangement space. Thus, one set is specified in a group composed of an object including the particular wireless device and the wireless device including a particular wireless device. This improves the accuracy of estimating a combination of the other objects and the other wireless devices.

In the estimation system, the estimation unit obtains starting point information in which the combination of the objects and the wireless devices is specified, and estimates the combination of the objects and the wireless devices in the arrangement pattern based on the first information, the second information, and the starting point information.

In this configuration, one set is specified in a group including the objects and the wireless devices. This improves the accuracy of estimating a combination of the other objects and the other wireless devices.

In the estimation system, the estimation unit calculates a difference between the number of the objects obtained based on the first information and the number of the wireless devices obtained based on the second information and estimates, when the difference does not exist, the combination of the objects and the wireless devices in the arrangement pattern.

When the arrangement space is relatively wide, information may be unable to be obtained from some of the wireless devices arranged in the arrangement space. In contrast, information may be able to be obtained from all of the wireless devices arranged in the arrangement space. When the number of the objects and the number of the wireless devices arranged in the arrangement space match each other, the estimation device estimates that information is obtained from all of the wireless devices arranged in the arrangement space. In this configuration, the combination of the objects and the wireless devices is estimated when the number of the objects and the number of the wireless devices arranged in the arrangement space match each other (i.e., when the difference does not exist). If estimation is performed when there is a difference between the numbers, calculation is performed inefficiently. The above configuration prevents such an estimation process that is performed when the difference exists.

In the estimation system, the estimation unit calculates a difference between the number of the objects obtained from the first information and the number of the wireless devices obtained based on the second information, specifies, when the difference exists, a predetermined space that includes the same number of the objects as the number of the wireless devices in the arrangement space, obtains, from the first information, information related to an arrangement pattern of the objects arranged in the predetermined space to treat the information as the first information, and estimates the combination of the objects and the wireless devices in the arrangement pattern based on the first information and the second information.

In this configuration, the combination of the objects and the wireless devices is estimated when the number of the objects and the number of the wireless devices arranged in the arrangement space do not match each other (i.e., when there is a difference between the numbers).

In the estimation system, the estimation unit further obtains third information related to the objects and fourth information related to the wireless devices, the fourth information being associated with the third information, and the estimation unit estimates the combination of the objects and the wireless devices in the arrangement pattern based on at least the first information, the second information, the third information, and the fourth information. In this configuration, the information relevant to the objects and the wireless devices is used to estimate the combination. This improves the accuracy of estimating the combination of the objects and the wireless devices.

In the estimation system, the first information is one of two-dimensional information that includes position information of the objects, three-dimensional information that includes the position information of the objects, and a layout of the objects. This configuration allows for estimation of the combination between the objects and the wireless devices based on any one of the two-dimensional information, the three-dimensional information, and the layout.

In the estimation system, the estimation unit obtains the combination of the objects and the wireless devices and then stores the combination of the objects and the wireless devices in the arrangement pattern in a memory device. In this configuration, after the combination of the objects and the wireless devices is stored, the information related to the combination of the objects and the wireless devices is obtained from the memory device.

In the estimation system, the estimation unit displays the combination of the objects and the wireless devices in the arrangement pattern on a display device.

In this configuration, the combination of the objects and the wireless devices is visually checked.

The estimation system further includes a determination unit that determines whether the combination of the objects and the wireless devices in the arrangement pattern is correct. The determination unit detects, for an object and a wireless device having a combination relationship with the object, whether the object and the wireless device are operating together by executing an operation check process of at least one of causing the wireless device to operate the object and obtaining information from the wireless device connected to the object by operating the object, determines that estimation of the combination relationship between the object and the wireless device in the arrangement pattern is correct when the wireless device and the object are operating together, and determines that the estimation of the combination relationship between the object and the wireless device in the arrangement pattern is incorrect when the wireless device and the object are not operating together. This configuration allows for determination of whether the combination relationship between the object and the wireless device is correct.

In the estimation system, the estimation system issues a notification indicating that the combination relationship between the object and the wireless device in the arrangement pattern is correct when it is determined that the estimation of the combination relationship between the object and the wireless device is correct, and the estimation system issues a notification indicating that the combination relationship between the object and the wireless device in the arrangement pattern is incorrect when it is determined that the estimation of the combination relationship between the object and the wireless device is incorrect. This configuration allows for notification of whether the combination relationship between the object and the wireless device is correct.

An estimation method that solves the above problem estimates an arrangement of objects. The estimation method includes obtaining information related to an arrangement pattern of the objects as first information, obtaining, from wireless devices respectively connected to the objects, information including response times between the wireless devices as second information, and estimating the arrangement of the objects based on the first information and the second information. In this configuration, the combination of the objects and the wireless devices in the arrangement pattern is estimated based on the information including the response times between the wireless devices and information related to the arrangement pattern of the objects. This allows the arrangement of the objects to be accurately estimated.

BRIEF DESCRIPTION OF DRAWINGS

FIG. 5 is a diagram showing a first array group related to the wireless devices.

FIG. 6 is a diagram showing the correspondence between the response time, which is an element of an array related to the wireless devices, and the identification number of each wireless device.

FIG. 7 is a diagram used to obtain an approximate index based on the first array related to the objects and the array related to the wireless devices.

FIG. 8 is a diagram used to obtain a combination of the objects and the wireless devices based on the first array related to the objects and a similar array related to the wireless devices.

FIG. 9 is a diagram showing a second array group related to the objects according to a second embodiment.

FIG. 10 is a diagram used to obtain a combination of the objects and the wireless devices based on the second array related to the wireless devices and a similar array related to the objects.

DESCRIPTION OF EMBODIMENTS

First Embodiment

Figure 1:
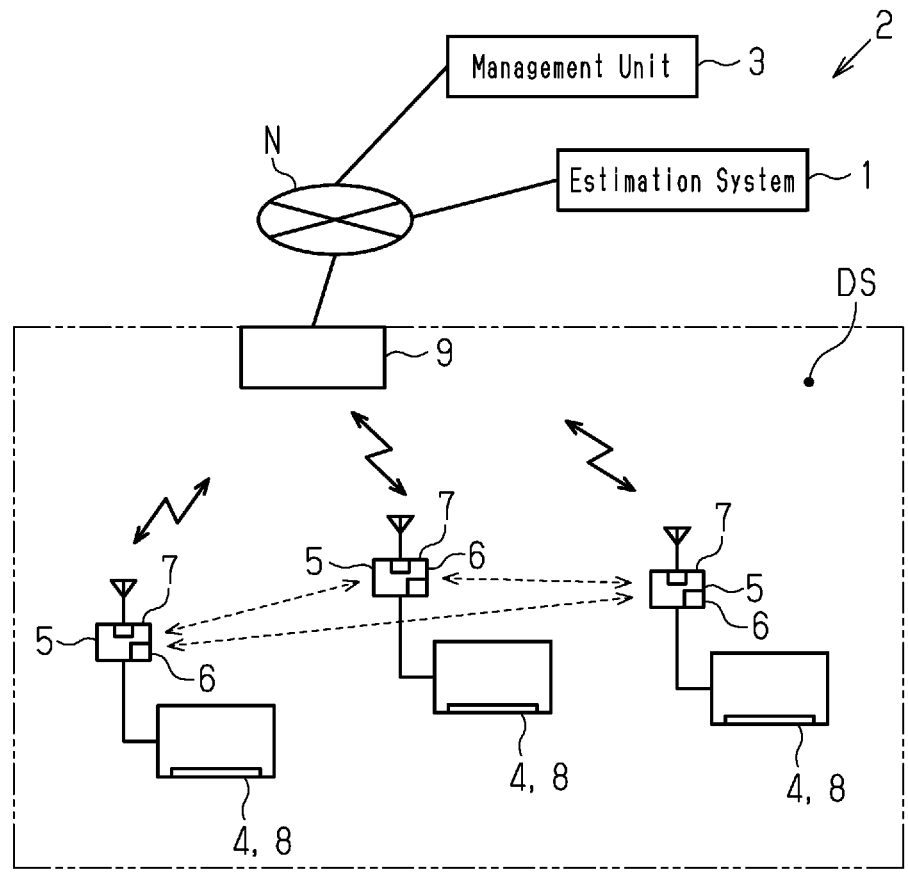
FIG. 1 is a schematic diagram of a management system subject to estimation performed by an estimation system.

An estimation system according to the present embodiment will now be described with reference to FIGS. 1 to 8.

When a wireless device 5 is connected to an object 4, specific information of the object 4 is obtained from the wireless device 5. It may be unknown where the object 4 having the specific information is arranged in a building. In addition, a wiring diagram may indicate multiple objects 4 with no specific information. In this case, although an arrangement pattern of the objects 4 is obtained from the wiring diagram, the information related to each object 4 is unknown. Thus, it is impossible to specify which object 4 in the wiring diagram corresponds to the object 4 with the specific information obtained from the wireless device 5. In the present embodiment, an estimation system 1 estimates the arrangement of the objects 4 so that the association between the objects 4 and the wireless devices 5 is known. Alternatively, the estimation system 1 estimates the arrangement of objects 4 so that the specific information of each object 4 is known.

Specifically, the estimation system 1 obtains first information as the information related to the arrangement pattern of the objects 4. The estimation system 1 assigns an identification number to each of the objects 4 in the arrangement pattern. The identification number is used to identify each object 4 in the arrangement pattern.

To build a management system 2 that manages the objects 4, wireless devices 5 are respectively connected to the objects 4 arranged in an arrangement space DS. This creates the arrangement space DS in which the objects 4 are respectively connected to the wireless devices 5 in a one-to-one relationship. At this stage, the estimation system 1 has no setting of a combination of the objects 4 and the wireless devices 5 in the arrangement pattern. Thus, the estimation system 1 estimates the combination of the objects 4 and the wireless devices 5 in the arrangement pattern. The estimation system 1 obtains the arrangement of the objects 4 associated with the wireless devices 5 based on the combination of the objects 4 and the wireless devices 5 in the arrangement pattern. Further, the estimation system 1 may obtain, from the wireless devices 5, specific information of the objects 4 respectively connected to the wireless devices 5. In this case, the estimation system 1 obtains the arrangement of the objects 4 with which the specific information is associated, based on the combination of the objects 4 and the wireless devices 5 in the arrangement pattern and based on the specific information of the objects 4.

The management system 2 is, for example, as follows. The management system 2 includes a management unit 3 and the wireless devices 5, which are respectively connected to the objects 4. Each wireless device 5 sends information related to the corresponding object 4 (hereinafter referred to as object-related information) to the management unit 3. The object-related information includes specific information of each object 4, information used by the object 4 to control the object 4, information indicating the state of the object 4, and information of a target with which the object 4 is involved. The specific information of the object 4 is specific to the object 4, and is assigned when the object 4 is shipped or produced. The management unit 3 obtains the object-related information from the wireless device 5 connected to the object 4. The management unit 3 is, for example, a server. The management unit 3 manages the object-related information of each of the objects 4.

As described above, building the management system 2 in such a manner includes connecting the wireless device 5 to the objects 4, respectively. During the connection, the wireless devices 5 may be respectively connected to the objects 4 without combining the identification numbers of the objects 4 with the identification numbers of the wireless devices 5 in the arrangement pattern. In such a case, the object-related information of the objects 4 can be obtained via the wireless devices 5. However, as described above, it is unknown the information of which object 4 corresponds to the object-related information of an object 4 in the arrangement pattern shown in the wiring diagram. Under such circumstances, the arrangement of the objects 4 in the arrangement pattern needs to be accurately estimated. When the arrangement of the objects 4 in the arrangement pattern is specified, the management unit 3 obtains the object-related information of the objects 4 via the wireless devices 5 and then associates the obtained information with a predetermined object 4 in the arrangement pattern shown in the wiring diagram. This allows a user of the management system 2 to understand what object 4 is in what status in the arrangement pattern based on the object-related information of the objects 4.

The object 4 is, for example, electric equipment. The electric equipment includes a device operated by electricity and a device operated by power other than electricity and controlled by electricity. Examples of the electric equipment include components of an air conditioner: namely, an indoor unit, an outdoor unit, a fan unit, an energy recovery ventilation, a cold water pump, a hot water pump, an electric valve provided in piping, a cooling device, a heating device, a monitoring camera, and a sensor. When the object 4 is electric equipment, the information used by the electric equipment to control the electric equipment, the information indicating the operating state of the electric equipment, and the information indicating an anomaly in the electric equipment each correspond to the object-related information. The electric equipment is configured to output the object-related information to the wireless device 5.

When the object 4 is a sensor, a detection value detected by the sensor, the information indicating the operating state of the sensor, and the information indicating an abnormal state of the sensor each correspond to the object-related information. The sensor is configured to output the object-related information to the wireless device 5. Examples of the sensor include an ammeter, a voltmeter, a weight sensor, a strain sensor, a torque sensor, a rotation angle sensor, a position sensor, an image sensor, a smoke sensor, a temperature sensor for the object 4, an illuminance sensor, a flow rate sensor, a human sensor, a thermometer, and a hygrometer. These sensors are configured to output the object-related information to the wireless device 5.

The example of the management system 2 will now be described with reference to FIG. 1. The management system 2 manages indoor units 8 of an air conditioner. The indoor units 8 respectively correspond to the objects 4 managed by the management system 2. The management system 2 includes the management unit 3 and the wireless devices 5 respectively connected to the indoor units 8. The management unit 3 obtains the object-related information from the indoor units 8 via the wireless devices 5. The management unit 3 manages the indoor units 8 based on the object-related information.

Each indoor unit 8 sends the object-related information to the management unit 3 via the corresponding wireless device 5. The wireless device 5 has an identification number. The wireless device 5 includes a communication unit 7. Each communication unit 7 sends the object-related information and the identification number to the management unit 3 via the connection device 9, which is connected to a network N. Examples of the connection device 9 include a gateway or a router. The communication unit 7 performs communication according to a predetermined communication standard. Examples of the predetermined communication standard include a standard conforming to IMT-2000, a standard conforming to IMT-Advanced, and a fifth generation standard. The network N includes at least one of the Internet, a local network, a mobile phone communication network, and a dedicated line network.

The wireless device 5 includes a response time measuring section 6. The response time measuring section 6 measures the response time of communication between two wireless devices 5. The response time measuring section 6 stores the response time between the wireless devices 5 as information (hereinafter referred to as response time information). The response time is defined as a time required for a predetermined signal output from a sending-side wireless device 5 to reach the receiving-side wireless device 5 and then return to the sending-side wireless device 5 in the communication between two wireless devices 5. Specifically, the response time is defined as the sum of a forward time for the predetermined signal output from the sending-side wireless device 5 to reach the receiving-side wireless device 5 and a return time for the predetermined signal output from the receiving-side wireless device 5 to reach the sending-side wireless device 5. Examples of the signal include a radio wave signal, a sound wave signal, and an optical signal.

Each wireless device 5 sends the response time information to an estimation unit 10 of the estimation system 1 through the corresponding communication unit 7. When sending the response time information, the wireless device 5 sends the response time information and the identification numbers of two wireless devices 5 related to the response time included in the response time information. Further, each wireless device 5 sends, as one set, the identification number of the wireless device 5 and the specific information of the object 4 connected to that wireless device 5 to the estimation unit 10 of the estimation system 1. The estimation unit 10 stores the identification number of the wireless device 5 and the specific information of the object 4 connected to that wireless device 5 as one set of data.

The estimation system 1 will now be described with reference to FIGS. 2 and 3. The estimation system 1 includes the estimation unit 10. The estimation unit 10 includes an arithmetic circuit. The arithmetic circuit includes a central processing unit (CPU) or a micro-processing unit (MPU). Specifically, the arithmetic circuit may be processing circuitry including: 1) one or more processors that execute various processes according to a computer program (software); 2) one or more dedicated hardware circuits (ASICs) that execute at least part of the various processes, or 3) a combination thereof. The processor includes a CPU and memories such as a RAM and a ROM. The memories store program codes or instructions configured to cause the CPU to execute processes. The memory, or a computer-readable medium, includes any type of media that are accessible by general-purpose computers and dedicated computers.

The estimation unit 10 obtains first information and second information. The estimation unit 10 estimates the arrangement of the objects 4 based on the first information and the second information. The first information is related to an arrangement pattern of the objects 4 arranged in the arrangement space DS. The arrangement pattern is information indicating a positional relationship between unidentified objects 4. In the present embodiment, the arrangement pattern of the objects 4 is information different from the arrangement of the objects 4. The arrangement of the objects 4 indicates an arrangement pattern of identified objects 4 to indicate to which object the object-related information obtained via the wireless device 5 belongs. Specifically, the arrangement of the objects 4 indicates an arrangement pattern of the objects 4 in which specific information of the objects 4 is known. Alternatively, the arrangement of the objects 4 indicates an arrangement pattern of the objects 4 each having a known connection relationship with the corresponding wireless device 5 with a known identification number.

The first information may be any information that indicates the object-to-object distance or object-to-object distance ratio of the objects 4 arranged in the arrangement space DS. The estimation unit 10 reads the object-to-object distance or object-to-object distance ratio of the objects from the first information. Hereinafter, the object-to-object distance includes the object-to-object distance ratio.

Examples of the first information include two-dimensional information including position information of the objects 4, three-dimensional information including position information of the objects 4, and a layout (see FIG. 3) of the objects 4. Examples of the two-dimensional information include two-dimensional CAD data, design drawings written on paper, and image data captured by a camera. Examples of the three-dimensional information include three dimensional CAD data. The specific information of each object 4 is not included in the first information.

The estimation unit 10 obtains the first information to assign an identification number to each of the objects 4 in the arrangement pattern. The estimation unit 10 assigns the identification number to each object 4 with a certain method. The identification number may numerical, or may be composed of characters. The identification number is used to identify each of the objects 4 in the arrangement pattern. When obtaining the object-to-object distance based on the first information, the estimation unit 10 obtains the identification numbers of two objects 4 related to the object-to-object distance. The estimation unit 10 stores the identification numbers of the two objects 4 and the object-to-object distance between the two objects 4 as one set of data.

The estimation unit 10 calculates the object-to-object distance based on at least one of the two-dimensional information including the position information of the objects 4, the three-dimensional information including the position information of the objects 4, and the layout of the objects 4.

The object-to-object distance may be a value equivalent to an actual distance, or may be a normalized value. In an example of normalization, each object-to-object distance is adjusted so that the largest value of the object-to-object distances becomes a predetermined value (for example, 1). For example, when 10, 50, and 100 are given as the object-to-object distances, the normalized object-to-object distances are 0.1, 0.5, and 1, respectively.

The second information includes the response time between wireless devices 5 (hereinafter referred to as response time information). The estimation unit 10 obtains the response time information from each wireless device 5 via the connection device 9. When the wireless device 5 saves the response time information in a server connected to the Internet, the estimation unit 10 obtains the response time information from the server. When obtaining the response time information, the estimation unit 10 obtains the identification numbers of two wireless devices 5 related to the response time information from the management unit 3 or the wireless devices 5. Further, the estimation unit 10 obtains the specific information of each object 4 connected to the corresponding wireless device 5 from the wireless device 5. The estimation unit 10 stores the identification numbers of the two wireless devices 5 and the response time information between the two wireless devices 5 as one set of data. The estimation unit 10 stores the identification number of each wireless device 5 and the specific information of the object 4 connected to that wireless device 5 as one set of data.

The response time may be normalized. For example, when 0.001 seconds, 0.005 seconds, and 0.01 seconds are given as response times, the respective normalized response times are 0.1, 0.5, and 1.

The estimation of a combination of the objects 4 and the wireless devices 5 in the arrangement pattern will now be described.

The estimation unit 10 defines, as a first array, one array selected from a first set having the object-to-object distances as elements. For example, the estimation unit 10 randomly selects elements one by one from the first set, which has the object-to-object distances as elements, to create the first array. In the first array, the object-to-object distances (elements of the first set) are arranged.

For example, the estimation unit 10 creates the first array as follows. The estimation unit 10 executes a selection process to select one object 4 from the objects 4. The selection method of the selection process is not particularly limited. For example, in the selection process of the estimation unit 10, one object 4 is selected from the objects 4 at random or according to a predetermined rule. Next, the estimation unit 10 creates the first array from the first set, which has the object-to-object distances as elements, with the selected object 4 as a starting point. Specifically, the objects 4 are arranged in the order of those closer to or farther from the object 4 that is selected as the starting point. The first array is obtained by arranging distances between two objects 4 sequentially combined from the starting point in the objects 4 sequentially arranged. For example, when the objects 4 are arranged in the order of an object 4(A), an object 4(B), and an object 4(C), the first array is obtained by arranging the distance between the objects 4(A) and 4(B), the distance between the objects 4(A) and 4(C), and the distance between the objects 4(B) and 4(C) in this order.

Figures 3, 4:
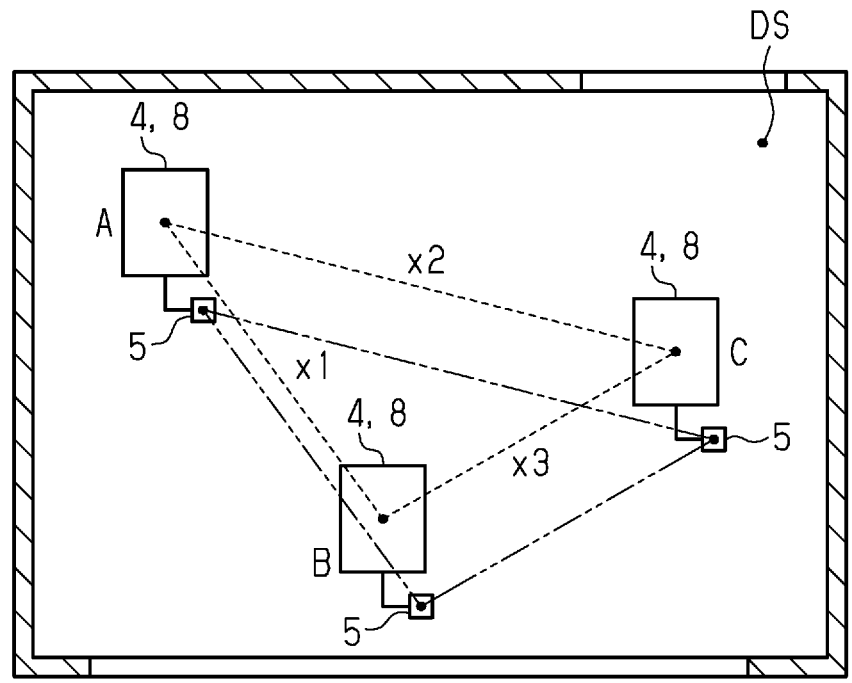
FIG. 3 is a diagram showing an arrangement pattern of objects.
FIG. 4 is a diagram showing the correspondence between the object-to-object distance, which is an element of a first array related to the objects, and the identification number of each object.

In the example shown in FIG. 3, the object-to-object distance between the objects 4(A) and 4(B) is x1, the object-to-object distance between the objects 4(A) and 4(C) is x2, and the object-to-object distance between the objects 4(B) and 4(C) is x3. In this case, the first set, having the object-to-object distances as elements, includes x1, x2, and x3. The estimation unit 10 selects one of the objects 4(A) to 4(C) as a starting point. When selecting the object 4(A) as the starting point, the estimation unit 10 arranges the objects 4 in the order of those closer to the object 4(A), which is the starting point. The estimation unit 10 arranges the object-to-object distances based on the order of this arrangement. For example, when the object 4(B) is closer to the object 4(A) as the starting point than the object 4(C), the estimation unit 10 arranges the objects 4 in the order of the objects 4(A), 4(B), and 4(C). Then, the estimation unit 10 arranges the object-to-object distances in the order of the object-to-object distances x1, x2, and the x3, and defines the array of this arrangement [x1, x2, x3] as the first array. The estimation unit 10 treats the object-to-object distance, which is an element of the first array, and the identification numbers of two objects 4 related to the object-to-object distance as one set. In this example, the estimation unit 10 treats x1, A, and B as one set, x2, A, and C as one set, and x3, B, and C as one set. FIG. 4 shows the relationship between the identification numbers of the objects 4 and the object-to-object distances. In FIG. 4, the number at the upper right of each grid indicates the rank of the element in the array.

The estimation unit 10 defines, as a first array group, one array group that can be selected from a second set that has the response times as elements. When the number of elements included in the second set having the response times as elements is n, the first array group is a group of arrays (also referred to as permutations) obtained by selecting n elements from the n elements. In the present embodiment, the second set having the response times as elements includes y1, y2, and y3. In FIG. 3, since the combination of the objects 4 and the wireless devices 5 in the arrangement pattern is not specified, y1, y2, and y3 are not shown.

In the present embodiment, the response time between the wireless device 5(a) and the wireless device 5(b) is y1, the response time between the wireless device 5(a) and the wireless device 5(c) is y2, and the response time between the wireless device 5(c) and the wireless device 5(b) is y3. As shown in FIG. 5, when there are three elements y1, y2, and y3 as the response times, the number of arrays which are the elements of the first array group is six: namely, [y1, y2, y3], [y1, y3, y2], [y2, y1, y3], [y2, y3, y1], [y3, y1, y2], and [y3, y2, y1].

The estimation unit 10 treats the response time, which is an element of the array, and the identification numbers of two wireless devices 5 related to the response time as one set. In this example, y1, a, and b form one set, y2, c, and a form one set, and y3, b, and c form one set. FIG. 6 shows the relationship between the identification numbers and response times of the wireless devices 5. FIG. 6 shows the relationship between the identification numbers and response times of the wireless devices 5. In FIG. 6, the number at the upper right of each grid indicates the rank of the element in the array.

From the first array group, the estimation unit 10 specifies the array closest to the first array as a similar array (see FIGS. 7 and 8). Specifically, the estimation unit 10 searches for the array closest to the first array group from the first array group by selecting arrays one by one from the first array group and comparing each selected array with the first array group.

The closeness of two arrays is defined as the sum of the differences between the elements of one array and the elements of the other. The difference is a positive value related to the difference between two values. The difference may be the absolute value of the difference, a value obtained by squaring the difference, or a value obtained by raising the difference to the fourth power. When two arrays are closest to each other, the sum of the differences is the smallest.

When two arrays are closest to each other, the sum of the differences may be substantially the smallest. That is, if there is an array having the smallest sum of the differences and there is an array having slightly larger values than the smallest sum of the differences, these two arrays both substantially belong to the smallest array.

In the present embodiment, the array closest to the first array in the first array group is referred to as the similar array. In the first array group, there may be one or more arrays closest to the first array.

The estimation unit 10 estimates a combination of the objects 4 and the wireless devices 5 based on a comparison between the first array and the similar array.

In the present embodiment, the estimation unit 10 associates the first-ranked element of the first array with the first-ranked element of the similar array. The estimation unit 10 associates the second-ranked element of the first array with the second-ranked element of the similar array. The estimation unit 10 associates the third-ranked element of the first array with the third-ranked element of the similar array.

From the correspondence, the estimation unit 10 associates the identification numbers of the two objects 4 associated with the first-ranked element of the first array with the identification numbers of the two wireless devices 5 associated with the first-ranked element of the similar array (see FIG. 8). Using the same method, the estimation unit 10 associates the identification numbers of the two objects 4 associated with the second-ranked element of the first array with the identification numbers of the two wireless devices 5 associated with the second-ranked element of the similar array from the association between the second-ranked element of the first array and the second-ranked element of the similar array (see "Correspondence between two objects and two wireless devices" in FIG. 8). Likewise, the estimation unit 10 associates each of all the elements of the first array with the corresponding element of the similar array.

Based on the correspondence between the identification numbers of two objects 4 and those of two wireless devices 5 (see "Correspondence between two objects 4 and two wireless devices 5" in FIG. 8), the estimation unit 10 obtains the identification numbers of the wireless devices 5 corresponding to those of multiple objects 4 for each of identification numbers of the objects 4 (see "Combination of objects and wireless devices in FIG. 8). Since identification numbers are respectively assigned to the objects 4 shown in the arrangement pattern, the combination of the objects 4 and the wireless devices 5 in the arrangement pattern is determined by obtaining the identification numbers of the wireless devices 5 respectively combined with those of the object 4.

After estimating the combination of the objects 4 and the wireless devices 5 in the arrangement pattern, the estimation unit 10 refers to one set of data including the identification number of a wireless device 5 and the specific information of the object 4 connected to that wireless device 5. Then, the estimation unit 10 stores the identification number of the object 4 and the specific information of the object 4 in the arrangement pattern as one set of data. In this manner, the specific information of the object 4 is associated with the object 4 in the arrangement pattern. Accordingly, the arrangement of the objects 4 in association with the specific information of the objects 4 is estimated.

After estimating the combination of the objects 4 and the wireless devices 5 in the arrangement pattern, the estimation unit 10 preferably stores the combination of the objects 4 and the wireless devices 5 in the arrangement pattern in a memory device 11. Alternatively, after estimating the combination of the objects 4 and the wireless devices 5 in the arrangement pattern, the estimation unit 10 preferably stores the combination of the identification numbers and specific information of the objects 4 in the arrangement pattern in the memory device 11. The memory device 11 includes at least one of a volatile memory, a non-volatile memory, a hard disk, an optical disk, a magnetic disk, and a magnetic tape.

The estimation unit 10 preferably displays a combination of the objects 4 and the wireless devices 5 on a display device 14. As an alternative, the estimation unit 10 preferably displays a combination of the objects 4 and the specific information of the objects 4 in the arrangement pattern on the display device 14. The display device 14 may include at least one of a liquid crystal monitor, a plasma display, an organic EL display, a projector, and VR goggles.

Specifically, in the layout of the objects 4, the display device 14 displays the identification number of each object 4 near that object 4, and displays, near the object 4, the identification number of the wireless device 5 combined with the object 4 and the specific information of the object 4. The display device 14 may display the object 4 and the wireless device 5 using icons.

In order to clearly show the relationship between an object 4 and the specific information of that object 4, the display device 14 may display that object 4 and the specific information of that object 4 so as to be connected by a line, or may display the object 4 and the specific information of the object 4 so as to be surrounded. In another example, the display device 14 displays a table of correspondence between the identification numbers of objects 4 and specific information of the objects 4 in the arrangement pattern. In this table, the identification numbers of the objects 4 and the specific information of the objects 4 are arranged horizontally.

In order to clearly show the relationship between an object 4 and the wireless device 5 combined with that object 4, the display device 14 may display the object 4 and the wireless device 5 combined with the object 4 so as to be connected by a line, or may display the object 4 and the wireless device 5 combined with the object 4 so as to be surrounded. In another example, the display device 14 displays a table of correspondence between objects 4 and wireless devices 5. In this table, the identification numbers of the objects 4 and those of the wireless devices 5 respectively combined with the objects 4 are arranged horizontally.

Figure 2:
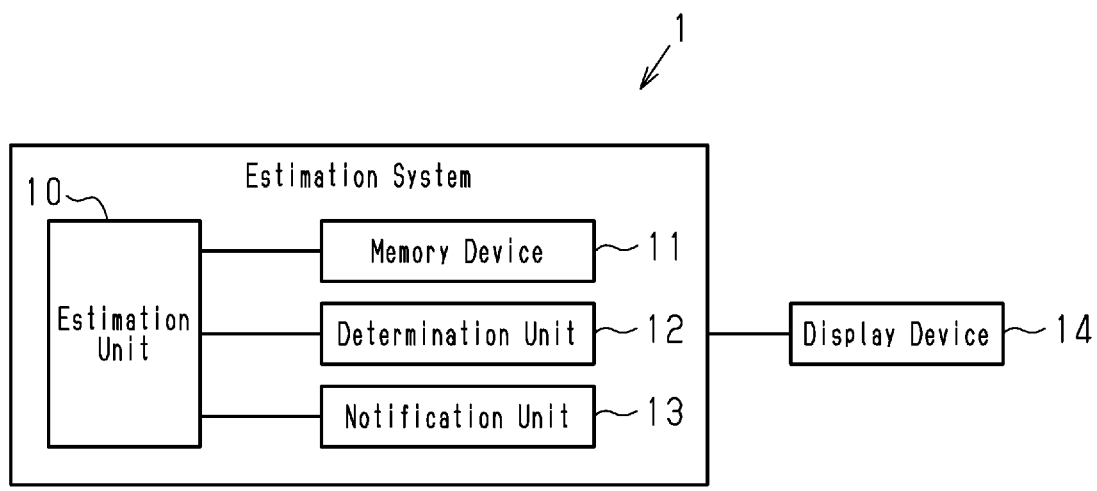
FIG. 2 is a block diagram of the estimation system according to the first embodiment.

Preferably, as shown in FIG. 2, the estimation system 1 further includes a determination unit 12 that determines whether the combination of the objects 4 and the wireless devices 5 in the arrangement pattern is correct.

The determination unit 12 detects whether each object 4 and the corresponding wireless device 5 are operating together by executing an operation check process. A first example of the operation check process is performed for an object 4 and the wireless device 5 having a combination relationship with that object 4 so that the object 4 is operated by the wireless device 5. In a second example of the operation check process, an object 4 is operated to obtain information from the wireless device 5 connected to that object 4. In the operation check process, the processes of the first and second examples may be executed.

For example, when determining the combination relationship between an object 4 in the arrangement pattern and the wireless device 5 combined with that object 4 in the arrangement pattern, the determination unit 12 causes the wireless device 5 to issue an object check instruction to the object 4 associated with the wireless device 5. The object check instruction is a test signal for checking response of the object 4. Further, when the wireless device 5 receives object-related information that is based on the object check instruction, the determination unit 12 instructs the wireless device 5 to output the object-related information. When receiving, from the wireless device 5, the object-related information output by the object 4 based on the object check instruction, the determination unit 12 determines that the wireless device 5 and the object 4 are operating together. When the wireless device 5 and the object 4 are operating together, the determination unit 12 determines that the estimation of the combination relationship between the objects 4 and the wireless devices 5 in the arrangement pattern is correct. When the determination unit 12 does not receive, from the wireless device 5, the object-related information output by the object 4 based on the object check instruction, the determination unit 12 determines that the wireless device 5 and the object 4 are not operating together. When the wireless device 5 and the object 4 are not operating together, the determination unit 12 determines that the estimation of the combination relationship between the objects 4 and the wireless devices 5 in the arrangement pattern is incorrect.

Preferably, as shown in FIG. 2, the estimation system 1 further includes a notification unit 13 that issues a notification of a result of the determination unit 12.

The notification unit 13 issues a notification indicating that the combination relationship between each object 4 and the corresponding wireless device 5 in the arrangement pattern is correct when it is determined that the estimation of the combination relationship between the object 4 and the wireless device 5 in the arrangement pattern is correct. The notification unit 13 issues a notification indicating that the combination relationship between the object 4 and the wireless device 5 in the arrangement pattern is incorrect when it is determined that the estimation of the combination relationship between the object 4 and the wireless device 5 in the arrangement pattern is incorrect.

For example, the notification unit 13 displays, on the display device 14, a result indicating that the estimation of the combination relationship between the object 4 and the wireless device 5 in the arrangement pattern is correct or incorrect. Alternatively, the notification unit 13 may use a speaker to output a result indicating that the estimation of the combination relationship between the object 4 and the wireless device 5 in the arrangement pattern is correct or incorrect.

An example of the estimation of the arrangement of the objects 4 in the arrangement pattern will now be described with reference to FIGS. 3 to 8.

Referring to FIG. 3, the management system 2 subject to estimation includes the objects 4 and the wireless devices 5 respectively connected to the objects 4. In this example, the management system 2 includes three objects 4. The objects 4 are indoor units 8 for an air conditioner. The wireless devices 5 are respectively connected to the objects 4. The wireless devices 5 can communicate with each other. The wireless devices 5 each obtain a response time of communication through communication with its counterpart as response time information. The wireless devices 5 are configured to send the response time information and the identification numbers of two wireless devices 5 to the estimation unit 10 of the estimation system 1 via the connection device 9. Further, the wireless devices 5 are each configured to access the corresponding object 4 connected to the wireless device 5 to obtain the specific information of the object 4, and send the specific information of the object 4 to the estimation unit 10 of the estimation system 1 via the connection device 9. The estimation system 1 is used for the management system 2 when, for example, the combination of the objects 4 and the wireless devices 5 is not defined although the wireless devices 5 are respectively connected to the objects 4. Even in a case where the combination of the objects 4 and the wireless devices 5 in the arrangement pattern is defined, the estimation system 1 may be used for the management system 2 in order to check the combination of the objects 4 and the wireless devices 5 in the arrangement pattern.

The estimation unit 10 assigns identification numbers A, B, and C to three objects 4 (three indoor units 8 in this example) in the arrangement pattern, respectively.

The estimation unit 10 reads the object-to-object distances of the three objects 4 from the layout of a building (see FIG. 3). For example, the estimation unit 10 calculates the object-to-object distances of the three objects 4 based on the coordinates of the centers of the objects 4. In the example shown in FIG. 3, the object-to-object distance between the objects 4(A) and 4(B) is x1, the object-to-object distance between the objects 4(A) and 4(C) is x2, and the object-to-object distance between the objects 4(B) and 4(C) is x3. The estimation unit 10 stores each object-to-object distance in association with the identification numbers of two objects 4 related to the object-to-object distance. In this example, the estimation unit 10 stores x1, A, and B as one set, x2, A, and C as one set, and x3, B, and C as one set.

The estimation unit 10 defines, as the first array, one array selected from the first set having the object-to-object distances as elements.

In this example, the elements of the first set are x1, x2, and x3. The estimation unit 10 executes the selection process to select one object 4(A) from the objects 4. Next, the estimation unit 10 uses the selected object 4 to as a starting point and then creates the first array by arranging the objects 4 from those closer to the object 4(A), which serves as the starting point. In this example, the estimation unit 10 defines [x1, x2, x3] as the first array. FIG. 4 shows the relationship between the identification numbers of the objects 4 and the object-to-object distances, which are elements of the first array.

The estimation unit 10 obtains, from the wireless devices 5, the response time information and the identification numbers of two wireless devices 5 related to the response time information.

In this example, the identification numbers of three wireless devices 5 are a, b, and c. The response time between the wireless devices 5(a) and 5(b) is y1. The response time between the wireless devices 5(a) and 5(c) is y2. The response time between the wireless devices 5(b) and 5(c) is y3. The estimation unit 10 stores each response time in association with the corresponding identification numbers of two wireless devices 5 related to the response time. In this example, the estimation unit 10 stores y1, a, and b as one set, y2, a, and c as one set, and y3, b, and c as one set.

Further, the estimation unit 10 obtains, from each wireless device 5, the specific information of the object 4 connected to that wireless device 5. The estimation unit 10 stores the identification number of the wireless device 5 and the specific information of the object 4 connected to that wireless device 5 as one set of data.

The estimation unit 10 defines, as the first array group, one array group that can be selected from the second set, which has the object-to-object distances as elements. In this example, the elements of the second set are y1, y2, and y3, and the number of the elements included in the second set is three.

As shown in FIG. 5, the estimation unit 10 creates all the arrays that can be selected from the second set including y1 to y3. From the second set, six types of arrays R1 to R6 are created. FIG. 6 shows the relationship of the array R1 between the response times, which are elements of the array R1, and the identification numbers of the wireless devices 5.

As shown in FIGS. 7 and 8, the estimation unit 10 specifies from the first array group, the array closest to the first array as the similar array.

In this example, the estimation unit 10 calculates an approximate index SM in order to measure how close two arrays are. The approximate index SM is defined as the sum of squares of the differences between elements at the same rank in the elements of the first array related to the object-to-object distance and the elements of the array related to the response time.

The estimation unit 10 compares the first array related to the object-to-object distance with the arrays included in the first array group related to the response time to calculate the approximate index SM for each array. The estimation unit 10 specifies, as the similar array, the array having the smallest value of the approximate indices SM in the first array group.

FIG. 8 shows the first array related to the object-to-object distance, the similar array that is related to the response time and is closest to the first array, the approximate index SM obtained from these two arrays, the correspondence between the identification numbers of two objects 4 and those of two wireless devices 5, and a combination of the objects 4 and the wireless devices 5. In this example, the similar array that is related to the response time and is closest to the first array is the array R3 [y2, y1, y3] in FIG. 5. In FIG. 8, the elements of the similar array [y2, y1, y3] are arranged such that the arrangement of the first- to third-ranked elements of the similar array (the arrangement in the table of FIG. 8) is the same as the arrangement of the first- to third-ranked elements of the first array (the arrangement in the table of FIG. 8).

The estimation unit 10 estimates the combination of the objects 4 and the wireless devices 5 based on the comparison between the first array and the similar array.

Specifically, the estimation unit 10 associates the first-ranked element in the first array with the first-ranked element in the similar array, associates the second-ranked element of the first array with the second-ranked element of the similar array, and associates the third-ranked element of the first array with the third-ranked element of the similar array.

From the correspondence, the estimation unit 10 associates the identification numbers of the two objects 4 associated with the first-ranked element of the first array with the identification numbers of the two wireless devices 5 associated with the first-ranked element of the similar array. Further, the estimation unit 10 associates the identification numbers of the two objects 4 associated with the second-ranked element of the first array with the identification numbers of the two wireless devices 5 associated with the second-ranked element of the similar array. Furthermore, the estimation unit 10 associates the identification numbers of the two objects 4 associated with the third-ranked element of the first array with the identification numbers of the two wireless devices 5 associated with the third-ranked element of the similar array.

Based on the correspondence between the identification numbers of the two objects 4 and those of the two wireless devices 5 (see "Correspondence between two objects 4 and two wireless devices 5" in FIG. 8), the estimation unit 10 obtains the identification numbers of the wireless devices 5 corresponding to those of multiple objects 4 for each of identification numbers of the objects 4 (see "Combination of objects and wireless devices in FIG. 8).

An example will now be described with reference to FIG. 8. In the example of "Correspondence between two objects and two wireless devices" in FIG. 8, identification numbers A and B of the objects 4 are respectively associated with identification numbers a and c of the wireless devices 5, and identification numbers B and C of the objects 4 are respectively associated with identification numbers c and b of the wireless devices 5. In this case, the former association relationship and the latter association relationship both include B and c. From this information, the estimation unit 10 estimates that B corresponds to c. Further, the estimation unit 10 estimates that A corresponds to a from the former correspondence relationship. Furthermore, the estimation unit 10 estimates that C corresponds to b from the latter correspondence relationship. This relationship matches a third correspondence between identification numbers C and A of the objects 4 and identification numbers b and c of the wireless devices 5 (the third row in "Correspondence between two objects 4 and two wireless devices 5" in FIG. 8).

The operation of the present embodiment will now be described.

Examples of a method for estimating a combination of the objects 4 and the wireless devices 5 in an arrangement pattern include a method for specifying the combination of the objects 4 and the wireless devices 5 by instructing one of the wireless devices 5 to operate the objects 4 and searching for the objects 4 that are operated by the instruction. However, in such a case, when the objects 4 are distributed in a relatively wide area, the objects 4 operated by the instruction cannot be easily found, which is time-consuming. In addition, when the number of objects 4 that are to be associated with the wireless devices 5 is relatively large, it is very burdensome.

In the present embodiment, the estimation unit 10 estimates a combination of the objects 4 and the wireless devices 5 based on the relationship between the object-to-object distances of the objects 4 and the relationship between the response times of the wireless devices 5. Thus, as compared with when the combination relationships between the objects 4 and the wireless devices 5 are individually combined with each other, the time for association is shortened. In addition, since the response time is proportional to the distance between the wireless devices 5, the estimation system 1 accurately estimates the combination of the objects 4 and the wireless devices 5 in the arrangement pattern. As a result, the arrangement of the objects 4 is accurately estimated such that the wireless devices 5 are respectively associated with the objects 4 in the arrangement pattern. Further, the estimation unit 10 associates each object 4 in the arrangement pattern with the specific information of that object 4 based on the information related to the combination of the objects 4 and the wireless devices 5 in the arrangement pattern, the identification numbers of the wireless devices 5, and the information indicating the sets of specific information of the objects 4 respectively connected to the wireless devices 5. This allows for estimation of the arrangement of the objects 4 in association with the specific information of the objects 4.

The advantages of the present embodiment will now be described.

(1) The estimation system 1 includes the estimation unit 10, which estimates the arrangement of the objects 4 based on the first information and the second information. This configuration allows for estimation of a combination of the objects 4 and the wireless devices 5 in the arrangement pattern based on the information including the response times between the wireless devices 5 and the information related to the arrangement pattern of the objects 4. As a result, the arrangement of the objects 4 is accurately estimated in association with the wireless devices 5.

(2) The estimation unit 10 estimates the combination of the objects 4 and the wireless devices 5 in the arrangement pattern based on the first information and the second information. The estimation unit 10 obtains, from the wireless devices 5, the specific information of the objects 4 respectively connected to the wireless devices 5. Then, the estimation unit 10 associates the specific information of the objects 4 with the objects 4 in the arrangement pattern based on the combination of the objects 4 and the wireless devices 5 in the arrangement pattern and based on the specific information of the objects 4. This configuration allows the arrangement of the objects 4 to be estimated in association with the specific information of the objects 4.

(3) The estimation unit 10 specifies, from the first array group, the array closest to the first array as the similar array and estimates the combination of the objects 4 and the wireless devices 5 based on the comparison between the first array and the similar array. This configuration allows the array closest to the first array to be specified from the first array group by repeating a simple routine. Based on the specifying, the combination of the objects 4 and the wireless devices 5 is estimated.

(4) The first information used by the estimation unit 10 is any one of two-dimensional information that includes the position information of the objects 4, three-dimensional information that includes the position information of the objects 4, and the layout of the objects 4. This configuration allows for estimation of the combination between the objects 4 and the wireless devices 5 based on any one of the two-dimensional information, the three-dimensional information, and the layout.

(5) After estimating the combination of the objects 4 and the wireless devices 5, the estimation unit 10 stores the combination of the objects 4 and the wireless devices 5 in the arrangement pattern in the memory device 11. This configuration allows the information related to the objects 4 and the wireless devices 5 to be obtained from the memory device 11 after storing the combination of the objects 4 and the wireless devices 5 in the memory device 11.

(6) In the estimation system 1, the estimation unit 10 displays the combination of the objects 4 and the wireless devices 5 in the arrangement pattern on the display device 14. In this configuration, the combination of the objects 4 and the wireless devices 5 is visually checked. For example, a screen indicating the combination of the objects 4 and the wireless devices 5 allows an operator to easily recognize the wireless device 5 corresponding to an object 4 at a predetermined position in the arrangement space DS. In addition, the operator is able to recognize a position where the object 4 corresponding to a predetermined wireless device 5 is located.

(7) The estimation system 1 further includes the determination unit 12, which determines whether the combination of the objects 4 and the wireless devices 5 in the arrangement pattern is correct. The determination unit 12 detects whether each object 4 and the corresponding wireless device 5 are operating together by executing at least one of a first operation check process and a second operation check process. The first operation check process is performed for an object 4 and the wireless device 5 having a combination relationship with that object 4 so that the object 4 is operated by the wireless device 5. In the second the operation check process, an object 4 is operated to obtain information from the wireless device 5 connected to that object 4. When the wireless device 5 and the object 4 are operating together, the determination unit 12 determines that the estimation of the combination relationship between the object 4 and the wireless device 5 in the arrangement pattern is correct. When the wireless device 5 and the object 4 are not operating together, the determination unit 12 determines that the estimation of the combination relationship between the object 4 and the wireless device 5 in the arrangement pattern is incorrect. This configuration allows for determination of whether the combination relationship between the object 4 and the wireless device 5 is correct.

(8) The estimation system 1 may include the notification unit 13. The notification unit 13 issues a notification indicating that the combination relationship between each object 4 and the corresponding wireless device 5 in the arrangement pattern is correct when the determination unit 12 determines that the estimation of the combination relationship between the object 4 and the wireless device 5 is correct. The notification unit 13 issues a notification indicating that the combination relationship between the object 4 and the wireless device 5 in the arrangement pattern is incorrect when the determination unit 12 determines that the estimation of the combination relationship between the object 4 and the wireless device 5 is incorrect. This configuration allows for notification of whether the combination relationship between the object 4 and the wireless device 5 is correct.

(9) In the estimation method of the present embodiment, the estimation unit 10 obtains information related to the arrangement pattern of the objects 4 as the first information and obtains, from the wireless devices 5 respectively connected to the objects 4, information including the response times between the wireless devices 5 as the second information. The estimation unit 10 estimates the arrangement of the objects 4 based on the first information and the second information. This configuration allows for estimation of the combination of the objects 4 and the wireless devices 5 in the arrangement pattern based on the information including the response times between the wireless devices 5 and the information related to the arrangement pattern of the objects 4. As a result, the arrangement of the objects 4 is accurately estimated in association with the wireless devices 5.

Second Embodiment

The estimation system 1 according to a second embodiment will now be described with reference to FIGS. 9 and 10. The estimation system 1 of the present embodiment is different from the estimation system 1 of the first embodiment in that one array is selected from the second set having response times as elements. The components that are the same as those of the estimation system 1 of the first embodiment are hereinafter given the same reference numerals, and thus will not be described in detail. The definitions of the elements x1, x2, and x3 of the first set and the elements y1, y2, and y3 of the second set are the same as those in the first embodiment.

The estimation unit 10 defines one array selected from the second set having response times as elements. For example, the estimation unit 10 randomly selects elements one by one from the second set, which has the response times as elements, to create the second array. In the second array, the response times (elements of the second set) are arranged. The estimation unit 10 treats each response time, which is an element of the second array, and the identification numbers of two wireless devices 5 related to the response time as one set.

For example, the estimation unit 10 creates the second array as follows. The estimation unit 10 executes a selection process to select one wireless device 5 from the wireless devices 5. The selection method of the selection process is not particularly limited. For example, in the selection process of the estimation unit 10, one wireless device 5 is selected from the wireless devices 5 at random or according to a predetermined rule. Next, the estimation unit 10 creates the second array from the second set, which has the response times as elements, with the selected wireless device 5 treated as a starting point. Specifically, the wireless devices 5 are arranged in the order of those having a shorter or longer response time from the wireless device 5 selected as the starting point. The second array is an array of response times between two wireless devices 5 that are sequentially combined from the starting point in the wireless devices 5 sequentially arranged. For example, when the wireless devices 5 are arranged in the order of wireless devices 5(*a*), 5(*b*), and 5(*c*), the second array is obtained by arranging the response time between the wireless devices 5(*a*) and 5(*b*), the response time between the wireless device 5(*a*) and 5(*c*), and the response time between the wireless device 5(*b*) and 5(*c*) in this order.

In the present embodiment, the response time between the wireless devices 5(*a*) and 5(*b*) is y1, the response time between the wireless devices 5(*a*) and 5(*c*) is y2, and the response time between the wireless devices 5(*b*) and 5(*c*) is y3. In this case, the second set having the response times as elements includes y1, y2, and y3.

The estimation unit 10 selects one of the wireless devices 5(*a*) to 5(*c*) as a starting point. When selecting the wireless device 5(*a*) as a starting point, the estimation unit 10 arranges the wireless devices 5 in the order of those having a shorter response time with the wireless device 5(*a*), which is the starting point. The estimation unit 10 arranges the response times based on the order of this arrangement. For example, when the wireless device 5(*b*) has a shorter response time with the wireless device 5(*a*), which is the starting point, than the wireless device 5(*c*), the estimation unit 10 arranges the wireless devices 5 in the order of the wireless devices 5(*a*), 5(*b*), and 5(*c*).

Then, the estimation unit 10 arranges the response times in the order of response times y1, y2, and y3, and defines the array of this arrangement [y1, y2, y3] as the second array. The estimation unit 10 treats each response time, which is an element of the second array, and the identification numbers of two wireless devices 5 related to the response time as one set. In this example, the estimation unit 10 treats y1, a, and b as one set, y2, a, and c as one set, and y3, b, and c as one set. FIG. 10 shows the relationship between the identification numbers and response times of the wireless devices 5. In FIG. 10, the number at the upper right of each grid indicates the rank of the element in the array.

The estimation unit 10 defines, as a second array group, an array group that can be selected from the first set, which has object-to-object distances as elements. When the number of elements included in the first set having the object-to-object distances as elements is m, the second array group is a group of arrays (also referred to as permutations) obtained by selecting m elements from the m elements. For example, as shown in FIG. 9, when there are three elements x1, x2, and x3 serving as the object-to-object distances, there are six arrays that are elements of the second array group: namely, [x1, x2, x3], [x1, x3, x2], [x2, x1, x3], [x2, x3, x1], [x3, x1, x2], and [x3, x2, x1]. The estimation unit 10 treats each object-to-object distance, which is an element of the array, and the identification numbers of two objects 4 related to the object-to-object distance as one set. Specifically, the estimation unit 10 treats x1, A, and B as one set, x2, A, and C as one set, and x3, B, and C as one set.

As shown in FIG. 10, the estimation unit 10 specifies, from the second array group, the array closest to the second array as a similar array.

FIG. 10 shows the second array related to the response time, the similar array that is related to the object-to-object distance and is closest to the second array, the approximate index SM obtained from these two arrays, the correspondence between the identification numbers of two objects 4 and those of two wireless devices 5, and the correspondence between the objects 4 and the wireless devices 5. In this example, the similar array that is related to the response time and is closest to the second array is the array R3 [x2, x1, x3] in FIG. 9. In FIG. 10, the elements of the similar array [x2, x1, x3] are arranged such that the arrangement of the first- to third-ranked elements of the similar array (the arrangement in the table of FIG. 10) is the same as the arrangement of the elements in the first- to third-ranked elements of the second array (the arrangement in the table of FIG. 10).

The estimation unit 10 estimates the combination of the objects 4 and the wireless devices 5 based on the comparison between the second array and the similar array.

Specifically, the estimation unit 10 associates the first-ranked element of the second array with the first-ranked element in the similar array, associates the second-ranked element of the second array with the second-ranked element in the similar array, and associates the third-ranked element of the second array with the third-ranked element of the similar array.

From the correspondence, the estimation unit 10 associates the identification numbers of the two wireless devices 5 associated with the first-ranked element of the second array with the identification numbers of the two objects 4 associated with the first-ranked element of the similar array. Further, the estimation unit 10 associates the identification numbers of the two wireless devices 5 associated with the second-ranked element of the second array with the identification numbers of the two objects 4 associated with the second-ranked element of the similar array. Furthermore, the estimation unit 10 associates the identification numbers of the two wireless devices 5 associated with the third-ranked element of the second array with the identification numbers of the two objects 4 associated with the third-ranked element of the similar array.

Based on the correspondence between the identification numbers of two objects 4 and those of two wireless devices 5 (see "Correspondence between two objects 4 and two wireless devices 5" in FIG. 10), the estimation unit 10 obtains the identification numbers of the objects 4 corresponding to those of multiple wireless devices 5 for each of identification numbers of the wireless devices 5 (see "Combination of object and wireless device in FIG. 10).

An example will now be described with reference to FIG. 10. In the example "Correspondence between two objects and two wireless devices" in FIG. 10, identification numbers a and b of the wireless devices are respectively associated with identification numbers A and C of the objects 4, and identification numbers b and c of the wireless devices 5 are respectively associated with identification numbers B and C of the objects 4. In this case, the former association relationship and the latter association relationship both include b and C. From this information, the estimation unit 10 estimates that b corresponds to C. Based on this estimation, the estimation unit 10 estimates that a corresponds to A from the former correspondence relationship. Further, the estimation unit 10 estimates that c corresponds to B from the latter correspondence relationship. This relationship matches a third correspondence between identification numbers c and a of the wireless devices 5 and identification numbers A and B of the objects 4 (the third row in "Correspondence between two objects 4 and two wireless devices 5" in FIG. 10).

The advantages of the present embodiment will now be described.

(1) The estimation system 1 includes the estimation unit 10, which estimates the arrangement of the objects 4 based on the first information and the second information. This configuration allows for estimation of a combination of the objects 4 and the wireless devices 5 in the arrangement pattern based on the information including the response times between the wireless devices 5 and the information related to the arrangement pattern of the objects 4. As a result, the arrangement of the objects 4 is accurately estimated in association with the wireless devices 5.

(2) The estimation unit 10 estimates the combination of the objects 4 and the wireless devices 5 in the arrangement pattern based on the first information and the second information. The estimation unit 10 obtains, from the wireless devices 5, the specific information of the objects 4 respectively connected to the wireless devices 5. Then, the estimation unit 10 associates the specific information of each object 4 with the corresponding object 4 in the arrangement pattern based on the combination of the objects 4 and the wireless devices 5 in the arrangement pattern and based on the specific information of the objects 4. This configuration allows the arrangement of the objects 4 to be estimated in association with the specific information of the objects 4.

(3) The estimation unit 10 specifies, from the second array group, the array closest to the second array as the similar array and estimates the combination of the objects 4 and the wireless devices 5 based on the comparison between the second array and the similar array. This configuration allows the array closest to the second array to be specified from the second array group by repeating a simple routine. Based on the specifying, the combination of the objects 4 and the wireless devices 5 is estimated.

(4) In the estimation method of the present embodiment, the estimation unit 10 obtains information related to the arrangement pattern of the objects 4 as the first information and obtains, from the wireless devices 5 respectively connected to the objects 4, information including the response times between the wireless devices 5 as the second information. The estimation unit 10 estimates the arrangement of the objects 4 based on the first information and the second information. This configuration allows for estimation of the combination of the objects 4 and the wireless devices 5 in the arrangement pattern based on the information including the response times between the wireless devices 5 and the information related to the arrangement pattern of the objects 4. As a result, the arrangement of the objects 4 is accurately estimated in association with the wireless devices 5.

Third Embodiment

The estimation system 1 according to a third embodiment will now be described with reference to FIG. 11. The estimation system 1 of the present embodiment is different from the estimation systems 1 of the first and second embodiments in that information other than the first information and the second information is used. The components that are the same as those of the estimation system 1 of the first embodiment are hereinafter given the same reference numerals, and thus will not be described in detail. The technique of the present embodiment is applicable to the first and second embodiments.

The estimation unit 10 obtains third information related to the objects 4 and fourth information related to the wireless devices 5.

The third information related to the objects 4 is used to specify the objects 4. Examples of the third information include a use number of each object 4 and a model number of the object 4. The estimation unit 10 may obtain the third information through an input operation from a keyboard. The estimation unit 10 may obtain the third information from two-dimensional information, three-dimensional information, or a layout including the position information of the objects 4. The estimation unit 10 stores the third information in association with the identification numbers of the objects 4.

The fourth information related to the wireless devices 5 is associated with the third information of the objects 4 to which the wireless devices 5 are respectively connected.

Specifically, the fourth information related to the wireless devices 5 is related to the third information sent from the wireless devices 5 respectively connected to the objects 4 having the third information. The wireless devices 5 output information related to the third information of the objects 4 to the estimation unit 10 as the fourth information. For example, each wireless device 5 obtains the use number of the corresponding object 4 as the third information from the object 4 and outputs the use number as the fourth information. The estimation unit 10 stores the fourth information in association with the identification number of the wireless device 5.

The estimation unit 10 estimates a combination of the objects 4 and the wireless devices 5 in the arrangement pattern based on at least the first information, the second information, the third information, and the fourth information.

The estimation unit 10 uses the method of the first or second embodiment to estimate the combination of the objects 4 and the wireless devices 5 in the arrangement pattern based on the first information and the second information. When results of multiple combinations of the objects 4 and the wireless devices 5 are obtained, the estimation unit 10 narrows down them to one combination of the objects 4 and the wireless devices 5 based on the third information and the fourth information.

Figures 11, 12:
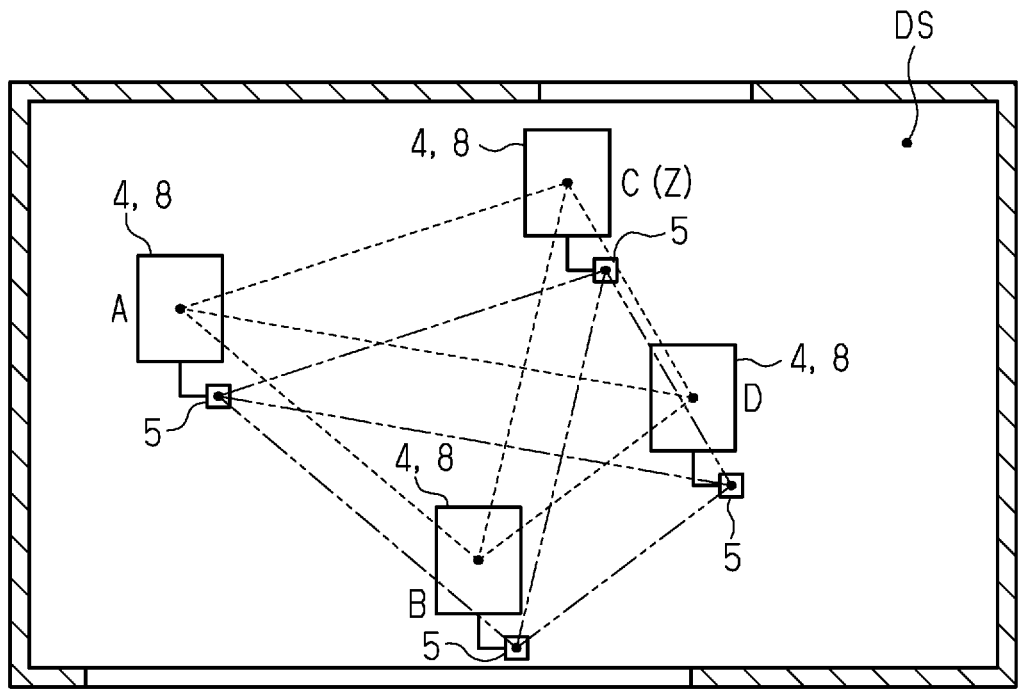
FIG. 11 is a diagram showing an arrangement pattern of the objects according to a third embodiment.
FIG. 12 is a diagram showing a combination of the objects and the wireless devices.

For example, when the objects 4 are arranged in a pattern as shown in FIG. 11, the objects 4(B) and 4(C) are equally distant from the objects 4(A) and 4(D). In such a case, the estimation unit 10 performs estimation to output two results for a combination of the objects 4 and the wireless devices 5. In this case, the estimation unit 10 estimates the combination of the objects 4 and the wireless devices 5 based on the third information, the identification numbers of the objects 4 associated with the third information, the fourth information obtained from the wireless devices 5, and the identification numbers of the wireless devices 5 associated with the fourth information.

FIG. 12 shows the combination of the objects 4 and the wireless devices 5 estimated based on the first information and the second information. This example shows two estimation results that are different in the section enclosed by the broken line in FIG. 12. In FIG. 12, Z refers to the third information. The third information (Z) is associated with the object 4(C). In FIG. 12, z refers to the fourth information. The fourth information (z) is associated with the wireless device 5(b). Since the fourth information (z) is relevant to the third information (Z), the estimation unit 10 associates the object 4(C) with the wireless device 5(*b*). The estimation unit 10 estimates the combination of the objects 4 and the wireless devices 5 based on the combination of the objects 4 and the wireless devices 5 estimated based on the first information and the second information and the combination of the objects 4 and the wireless devices 5 estimated based on the third information and the fourth information. In the example of FIG. 12, the estimation unit 10 determines that the upper combination is the most appropriate combination.

The advantages of the present embodiment will now be described.

The estimation unit 10 obtains the third information, which is related to the objects 4, and the fourth information, which is related to the wireless devices 5 and associated with the third information. The estimation unit 10 estimates a combination of the objects 4 and the wireless devices 5 based on at least the first information, the second information, the third information, and the fourth information. In this configuration, the information relevant to the objects 4 and the wireless devices 5 is used to estimate the combination. This improves the accuracy of estimating the combination of the objects 4 and the wireless devices 5 in the arrangement pattern.

Fourth Embodiment

The estimation system 1 according to a fourth embodiment will now be described. The estimation system 1 of the present embodiment is different from the estimation systems 1 of the first to third embodiments in that at least one of the first information and the second information is processed. The components that are the same as those of the estimation system 1 of the first embodiment are hereinafter given the same reference numerals, and thus will not be described in detail. The technique of the present embodiment is applicable to the first to third embodiments.

The object-to-object distance may be inaccurately obtained. Further, the response time may be inaccurately obtained. In such a case, the estimation unit 10 incorrectly specifies a similar array. When incorrectly specifying the similar array, the estimation unit 10 preferably lists candidates. For example, when multiple objects 4 include two sets of objects 4 having substantially the same difference in object-to-object distance, the estimation unit 10 regards the two object-to-object distances that are substantially equal to each other being an equal distance. When multiple wireless devices 5 include two sets of wireless devices 5 having substantially the same difference in response time, the estimation unit 10 regards the two response times that are substantially equal to each other being an equal response time. An example will now be described.

The estimation unit 10 executes preprocessing that is performed before estimating a combination of the objects 4 and the wireless devices 5.

The estimation unit 10 performs the preprocessing for the first information to compare multiple object-to-object distances with each other. When the difference between the object-to-object distances is equal to or less than a predetermined value, the estimation unit 10 changes the values of the object-to-object distances such that the object-to-object distances in which the difference in object-to-object distance is less than or equal to the predetermined value become equal to each other.

For the second information, the estimation unit 10 compares multiple response times with each other. When the difference between the response times is equal to or less than a predetermined value, the estimation unit 10 changes the values of the response times such that the response times in which the difference in response time is less than or equal to the predetermined value become equal to each other.

The estimation unit 10 estimates a combination of the objects 4 and the wireless devices 5 based on the preprocessed first and second information, the first information, and the second information. In this case, the estimation unit 10 outputs multiple results as candidates as the combination of the objects 4 and the wireless devices 5.

The advantages of the present embodiment will now be described.

The estimation unit 10 performs the above-described preprocessing for the first and second information before estimating a combination of the objects 4 and the wireless devices 5. This configuration produces the following advantage.

The object-to-object distance and the response time may each have an error. If a combination of the objects 4 and the wireless devices 5 is estimated based on the object-to-object distance and response time including errors, the combination of the objects 4 and the wireless devices 5 may be incorrectly estimated. In such a case, multiple results are preferably output instead of estimating the relationships between the objects 4 and the wireless devices 5 in a one-to-one relationship. In the above configuration, when the difference in object-to-object distance or response time is less than or equal to a predetermined value, the estimation results are obtained such that the relationships between the objects 4 and the wireless devices 5 are not estimated in a one-to-one relationship. Thus, when the objects 4 and the wireless devices 5 cannot be accurately estimated in a one-to-one relationship, multiple estimation results are obtained. Accordingly, a correct combination is found from the selected estimation results.

Modifications

In addition to the above embodiments, the estimation system 1 of the present disclosure may have, for example, the following modifications and a combination of at least two modifications that remain consistent each other.

The estimation system 1 according to a modification will now be described with reference to FIG. 13. The estimation unit 10 may obtain starting point information when estimating a combination of the objects 4 and the wireless devices 5 respectively connected to the objects 4. The starting point information is related to the combination of the objects 4 and the wireless devices 5 specified in advance through an operation check. The estimation unit 10 may obtain, as the starting point information, information related to the combination of the objects 4 and the wireless devices 5 selected in the first embodiment. The starting point information has no relevance to the starting point used in the embodiments.

For example, the estimation unit 10 obtains the starting point information of at least one of the objects 4. The estimation unit 10 estimates the combination of the objects 4 and the wireless devices 5 based on the first information, the second information, and the starting point information.

For example, for any one of the objects 4, a combination of that object 4 and the corresponding wireless device 5 is specified before estimation by the estimation system 1. Specifically, by operating a predetermined object 4, the identification number of the wireless device 5 sent from the wireless device 5 connected to the predetermined object 4 is obtained. The estimation unit 10 associates the predetermined object 4 with the identification number of the wireless device 5 sent from the wireless device 5 connected to the predetermined object 4, and stores this correspondence as the starting point information.

Figures 13, 14:
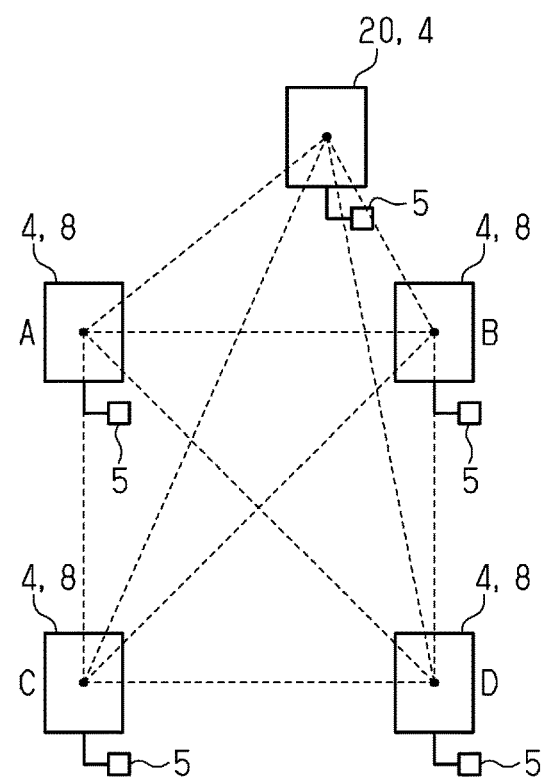
FIG. 13 is a diagram showing a combination of the objects and the wireless devices according to a modification of the estimation system.
FIG. 14 is a diagram showing an arrangement pattern of a particular wireless device and the objects according to the modification of the estimation system.

FIG. 13 shows the combination of the objects 4 and the wireless devices 5 estimated based on the first information and the second information. FIG. 13 shows two estimation results that are different in the section enclosed by the broken line in FIG. 13.

In the example of FIG. 13, the object 4(B) is associated with a wireless device 5(d). The correspondence between the object 4(B) and the wireless device 5(d) is the starting point information. Based on two combinations and the starting point information, the estimation unit 10 specifies the combination of the objects and the wireless devices. In the example of FIG. 13, the estimation unit 10 determines that the upper combination is the most appropriate combination.

The advantage of this example will now be described.

The estimation unit 10 obtains the starting point information, in which a combination of the objects 4 and the wireless devices 5 is specified. Then, the estimation unit 10 estimates the combination of the objects 4 and the wireless devices 5 in the arrangement pattern based on the first information and the second information. In this configuration, one set is specified in a group including the objects 4 and the wireless devices 5. This improves the accuracy of estimating a combination of the other objects 4 and the other wireless devices 5.

The estimation system 1 according to another modification will now be described with reference to FIG. 14.

For the management system 2 including the objects 4 and the wireless devices 5, the estimation unit 10 may obtain multiple results for a combination of the objects 4 and the wireless devices 5 in the arrangement pattern. In this case, a particular wireless device 20 may be added to the arrangement space DS as a dummy. The particular wireless device 20 does not have to be arranged in the arrangement space DS, and is a dummy used for the estimation of the combination of the objects 4 and the wireless devices 5. The particular wireless device 20 is communicable with wireless devices 5 and can be arranged in the arrangement space DS. The particular wireless device 20 is an object in which an object 4 is integrated with the wireless device 5 connected to that object 4. The particular wireless device 20 may be movable. The arrangement of such a particular wireless device 20 produces fewer estimation results of the combination of the objects 4 and the wireless devices 5.

FIG. 14 shows an example of an arrangement pattern in which the objects 4 are respectively arranged at the tops of a regular polygon. In this case, the estimation unit 10 outputs multiple estimation results for the combination of the objects 4 and the wireless devices 5. In this case, the dummy is arranged at a position deviated from the center of the regular polygon in the arrangement space DS. Further, a dummy mark is added to the arrangement pattern of the objects 4.

Such an operation increases the number of different object-to-object distances between the objects 4 (including the dummy). Thus, the combination of the objects 4 and the wireless devices 5 is easily specified. Specifically, when the particular wireless device 20 is arranged in the arrangement space DS, in which the objects 4 are arranged, the estimation unit 10 defines the particular wireless device 20 as belonging to the objects 4 and the wireless devices 5. The estimation unit 10 obtains, as the first information, the information related to the arrangement pattern of the objects 4 arranged in the arrangement space DS and the information related to the arrangement pattern of the particular wireless device 20. Specifically, the information obtained by adding position information of the particular wireless device 20 to a diagram or three-dimensional information indicating the arrangement pattern of the objects 4 is used as the first information. The estimation unit 10 obtains, as the second information, information including the response times between the wireless devices 5 from a group including the wireless devices 5 and the particular wireless device 20. Based on the first information and the second information, the estimation unit 10 estimates the combination of the objects 4 including the particular wireless device 20 and the wireless devices 5 including the particular wireless device 20.

The advantage of this example will now be described.

The estimation system 1 further includes the particular wireless device 20. The estimation unit 10 defines the particular wireless device 20 as belonging to any of the objects 4 and the wireless devices 5. The estimation unit 10 obtains, as the first information, the information related to the arrangement pattern of the objects 4 and the particular wireless device 20 arranged in the arrangement space DS. Further, the estimation unit 10 obtains, as the second information, information including the response times between the wireless devices 5 from a group of the wireless devices 5 including the wireless devices 5 and the particular wireless device 20. Based on the first information and the second information, the estimation unit 10 estimates a combination of the objects 4 and the wireless devices 5 in the arrangement pattern.

The particular wireless device 20 is defined as belonging to an object 4 and a wireless device 5. Thus, in the estimation of a combination of an object 4 and a wireless device, the particular wireless device 20 is treated as a device in which the combination of the object 4 and the wireless device has been determined in advance. Such a particular wireless device 20 is arranged at a predetermined position in the arrangement space DS. Thus, one set is specified in a group composed of the object 4 including the particular wireless device 20 and the wireless device 5 including the particular wireless device 20. This improves the accuracy of estimating a combination of the other objects 4 and the other wireless devices 5. The other objects 4 refer to objects 4 other than the particular wireless device 20. The other wireless devices 5 refer to wireless devices 5 other than the particular wireless device 20.

Figure 15:
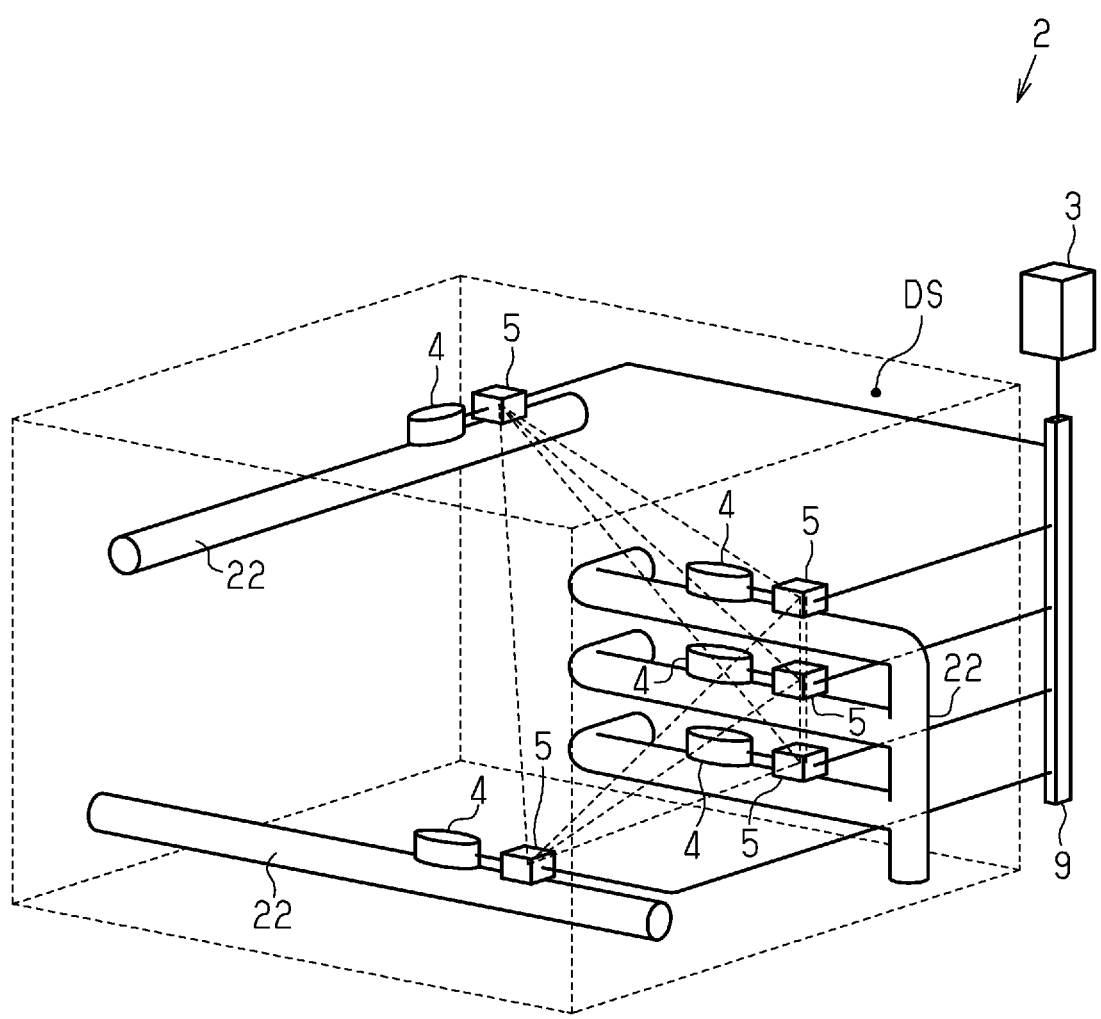
FIG. 15 is a diagram showing another example of the management system estimated by the estimation system.

FIG. 15 shows a management system 2 that manages objects 4 arranged three-dimensionally. To build such a management system 2, the estimation system 1 estimates a combination of the objects 4 and the wireless devices 5 in the arrangement pattern. In this modification, each object 4 is an electric valve disposed in piping 22. Each wireless device 5 is connected to the corresponding electric valve. The wireless devices 5 are connected to the management unit 3 via the connection device 9. The connection device 9 is, for example, a router. The management unit 3 is, for example, a personal computer. In this modification, the first information is three-dimensional information including the arrangement of the electric valves. The second information includes the response times between the wireless devices 5 respectively connected to the electric valves. For such a management system 2, the relationship between the electric valves and the wireless devices 5 is estimated using a method that is the same as the above method.

When the arrangement space DS is relatively wide, information may be unable to be obtained from some of the wireless devices 5 arranged in the arrangement space DS. In contrast, information may be able to be obtained from all of the wireless devices 5 arranged in the arrangement space DS. In the arrangement space DS where a combination is to be specified, the combination cannot be specified when the number of objects 4 matches that of wireless devices 5.

To solve this problem, the estimation unit 10 may calculate the difference between the number of objects 4 obtained based on the first information and the number of wireless devices 5 obtained based on the second information. If the difference does not exist, the estimation unit 10 may estimate a combination of the objects 4 and the wireless devices 5 in the arrangement pattern.

In this configuration, the combination of the objects 4 and the wireless devices 5 is estimated when the number of the objects 4 and the number of the wireless devices 5 arranged in the arrangement space DS match each other (i.e., when the difference does not exist). If estimation is performed when there is a difference between the numbers, calculation is performed inefficiently. The above configuration prevents such an estimation process that is performed when the difference exists.

When the difference exists, the estimation unit 10 further specifies a predetermined space that includes the same number of objects 4 as the number of wireless devices 5 in the arrangement space DS. The predetermined space is included in the arrangement space DS. The estimation unit 10 specifies the predetermined space from the arrangement space DS in accordance with a predetermined rule. After specifying the predetermined space, the estimation unit 10 may obtain information related to an arrangement pattern of objects 4 arranged in the predetermined space from the first information to treat that information as the first information, and estimate a combination of the objects 4 and the wireless devices 5 in the arrangement pattern based on the first information and the second information. In this configuration, the combination of the objects 4 and the wireless devices 5 is estimated when the number of the objects 4 and the number of the wireless devices 5 arranged in the arrangement space DS do not match each other (i.e., when there is a difference between the numbers).

While the embodiments of the estimation system 1 have been described herein above, it is to be appreciated that various changes in form and detail may be made without departing from the spirit and scope of the estimation system 1 described in the claims.

The invention claimed is:

1. An estimation system that estimates an arrangement of objects, the estimation system comprising an estimation unit that obtains information related to an arrangement pattern of the objects as first information and obtains, from wireless devices respectively connected to the objects, information including response times between the wireless devices as second information to estimate the arrangement of the objects based on the first information and the second information,
   wherein the estimation unit:
      estimates a combination of the objects and the wireless devices in the arrangement pattern based on the first information and the second information in an arrangement space (DS) in which the wireless devices are respectively connected to the objects in a one-to-one relationship;
      obtains specific information of the objects respectively connected to the wireless devices from the wireless devices; and
      associates the specific information of the objects with the objects in the arrangement pattern based on the combination of the objects and the wireless devices and the specific information of the objects in the arrangement pattern.

2. The estimation system according to claim 1, further comprising a particular wireless device capable of communicating with the wireless devices and arranged in the arrangement space (DS), wherein the estimation unit:
   defines the particular wireless device as belonging to any of the objects and the wireless devices;
   obtains, as the first information, information related to an arrangement pattern of the objects and the particular wireless device arranged in the arrangement space (DS); obtains, as the second information, information including response times between the wireless devices obtained from a wireless device group that includes the wireless devices and the particular wireless device; and
   estimates the combination of the objects and the wireless devices in the arrangement pattern based on the first information and the second information.

3. The estimation system according to claim 2, wherein the estimation unit obtains starting point information in which the combination of the objects and the wireless devices is specified, and estimates the combination of the objects and the wireless devices in the arrangement pattern based on the first information, the second information, and the starting point information.

4. The estimation system according to claim 2, wherein the estimation unit calculates a difference between the number of the objects obtained based on the first information and the number of the wireless devices obtained based on the second information and estimates, when the difference does not exist, the combination of the objects and the wireless devices in the arrangement pattern.

5. The estimation system according to claim 2, wherein the estimation unit calculates a difference between the number of the objects obtained from the first information and the number of the wireless devices obtained based on the second information, specifies, when the difference exists, a predetermined space (DSX) that includes the same number of the objects as the number of the wireless devices in the arrangement space (DS), obtains, from the first information, information related to an arrangement pattern of the objects arranged in the predetermined space (DSX) to treat the information as the first information, and estimates the combination of the objects and the wireless devices in the arrangement pattern based on the first information and the second information.

6. The estimation system according to claim 2, wherein the estimation unit further obtains third information related to the objects and fourth information related to the wireless devices, the fourth information being associated with the third information, and
   the estimation unit estimates the combination of the objects and the wireless devices in the arrangement pattern based on at least the first information, the second information, the third information, and the fourth information.

7. The estimation system according to claim 1, wherein the estimation unit obtains starting point information in which the combination of the objects and the wireless devices is specified, and estimates the combination of the objects and the wireless devices in the arrangement pattern based on the first information, the second information, and the starting point information.

8. The estimation system according to claim 7, wherein the estimation unit calculates a difference between the number of the objects obtained based on the first information and the number of the wireless devices obtained based on the second information and estimates, when the difference does not exist, the combination of the objects and the wireless devices in the arrangement pattern.

9. The estimation system according to claim 7, wherein the estimation unit calculates a difference between the number of the objects obtained from the first information and the number of the wireless devices obtained based on the second information, specifies, when the difference exists, a predetermined space (DSX) that includes the same number of the objects as the number of the wireless devices in the arrangement space (DS), obtains, from the first information, information related to an arrangement pattern of the objects arranged in the predetermined space (DSX) to treat the information as the first information, and estimates the combination of the objects and the wireless devices in the arrangement pattern based on the first information and the second information.

10. The estimation system according to claim 1, wherein the estimation unit calculates a difference between the number of the objects obtained based on the first information and the number of the wireless devices obtained based on the second information and estimates, when the difference does not exist, the combination of the objects and the wireless devices in the arrangement pattern.

11. The estimation system according to claim 10, wherein the estimation unit calculates a difference between the number of the objects obtained from the first information and the number of the wireless devices obtained based on the second information, specifies, when the difference exists, a predetermined space (DSX) that includes the same number of the objects as the number of the wireless devices in the arrangement space (DS), obtains, from the first information, information related to an arrangement pattern of the objects arranged in the predetermined space (DSX) to treat the information as the first information, and estimates the combination of the objects and the wireless devices in the arrangement pattern based on the first information and the second information.

12. The estimation system according to claim 1, wherein the estimation unit calculates a difference between the number of the objects obtained from the first information and the number of the wireless devices obtained based on the second information, specifies, when the difference exists, a predetermined space (DSX) that includes the same number of the objects as the number of the wireless devices in the arrangement space (DS), obtains, from the first information, information related to an arrangement pattern of the objects arranged in the predetermined space (DSX) to treat the information as the first information, and estimates the combination of the objects and the wireless devices in the arrangement pattern based on the first information and the second information.

13. The estimation system according to claim 1, wherein the estimation unit further obtains third information related to the objects and fourth information related to the wireless devices, the fourth information being associated with the third information, and
the estimation unit estimates the combination of the objects and the wireless devices in the arrangement pattern based on at least the first information, the second information, the third information, and the fourth information.

14. The estimation system according to claim 1, wherein the first information is one of two-dimensional information that includes position information of the objects, three-dimensional information that includes the position information of the objects, and a layout of the objects.

15. The estimation system according to claim 1, wherein the estimation unit obtains the combination of the objects and the wireless devices and then stores the combination of the objects and the wireless devices in the arrangement pattern in a memory device.

16. The estimation system according to claim 1, wherein the estimation unit displays the combination of the objects and the wireless devices in the arrangement pattern on a display device.

17. The estimation system according to claim 1, further comprising a determination unit that determines whether the combination of the objects and the wireless devices in the arrangement pattern is correct, wherein the determination unit:
  detects, for an object and a wireless device having a combination relationship with the object, whether the object and the wireless device are operating together by executing an operation check process of at least one of causing the wireless device to operate the object and obtaining information from the wireless device connected to the object by operating the object;
  determines that estimation of the combination relationship between the object and the wireless device in the arrangement pattern is correct when the wireless device and the object are operating together; and
  determines that the estimation of the combination relationship between the object and the wireless device in the arrangement pattern is incorrect when the wireless device and the object are not operating together.

18. The estimation system according to claim 17, wherein the estimation system issues a notification indicating that the combination relationship between the object and the wireless device in the arrangement pattern is correct when it is determined that the estimation of the combination relationship between the object and the wireless device is correct, and
the estimation system issues a notification indicating that the combination relationship between the object and the wireless device in the arrangement pattern is incorrect when it is determined that the estimation of the combination relationship between the object and the wireless device is incorrect.

19. An estimation method for estimating an arrangement of objects, the estimation method comprising:
  obtaining information related to an arrangement pattern of the objects as first information;
  obtaining, from wireless devices respectively connected to the objects, information including response times between the wireless devices as second information; and
  estimating the arrangement of the objects based on the first information and the second information, wherein the estimating includes:
  estimating a combination of the objects and the wireless devices in the arrangement pattern based on the first information and the second information in an arrangement space (DS) in which the wireless devices are respectively connected to the objects in a one-to-one relationship,
  obtaining specific information of the objects respectively connected to the wireless devices from the wireless devices; and
  associating the specific information of the objects with the objects in the arrangement pattern based on the combination of the objects and the wireless devices and the specific information of the objects the arrangement pattern.

\* \* \* \* \*